June 6, 1961

R. P. DE VAULT 2,986,813

PARING IMPLEMENT

Filed May 18, 1959

INVENTOR.
RALPH P. DE VAULT
BY C. J. Stratton
ATTORNEY 2,986,813
PARING IMPLEMENT
Ralph P. De Vault, Arcadia, Calif.
(20575 Seaboard Way, Malibu, Calif.)
Filed May 18, 1959, Ser. No. 813,838
3 Claims. (Cl. 30—280)

This invention relates to an implement for paring or peeling fruits and vegetables rapidly and with such efficiency that conservation of food and the nutriments thereof is effected.

An object of the present invention is to provide a paring implement that is also useful for slicing and shredding and which embodies a novel blade-mounting construction that is an improvement over prior devices for the same purpose.

Another object of the invention is to provide a paring, slicing and shredding device for kitchen use that embodies a simplified construction that is both efficient in operation and economical to manufacture.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Figure 1:
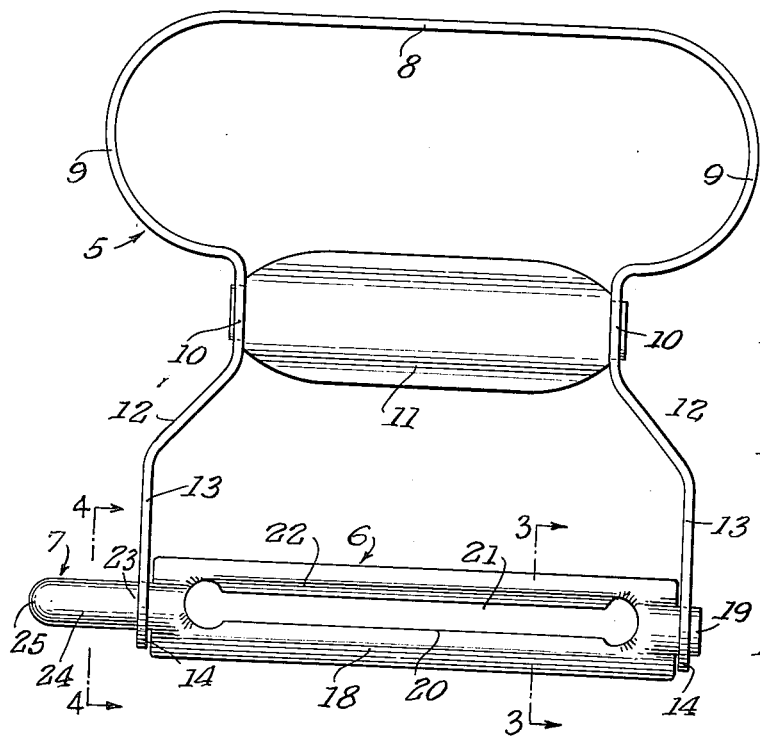
FIG. 1 is a side elevational view of a paring implement according to the present invention.
Figure 3:
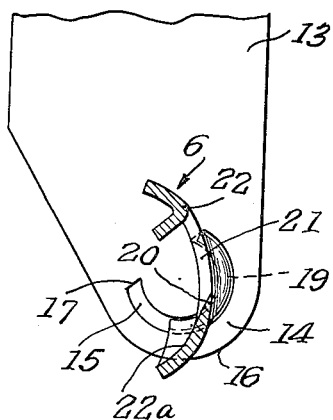
Figure 4:
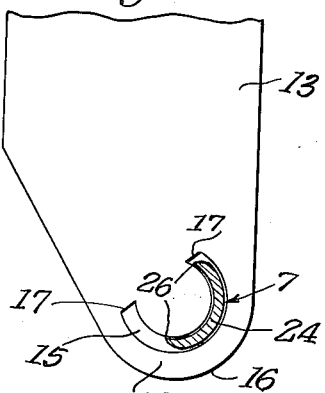

FIGS. 3 and 4 are enlarged cross-sectional views as taken on the respective lines 3—3 and 4—4 of FIG. 1.

The implement that is illustrated comprises, generally, a frame 5 that constitutes a handle, and a blade 6 mounted in said frame and provided with a shredding extension 7.

The frame 5 is advantageously made of flat metal strip stock and formed, by bending, to have a transverse portion 8 that terminates at opposite ends as oppositely curved side portions 9. Said portions 8 and 9 constitute the handle of the frame. Parallel extension portions 10 extend from the ends of the curved portions 9 and the same are connected by a transverse brace 11 to render said handle rigid. Diverging extensions 12 of the portions 10 terminate in parallel leg portions 13 that have free ends 14 that are reduced in width. Said leg portions have limited flexibility due to the bends that join extensions 10 and 12 and the extensions 12 with the legs. Accordingly, said leg portions may be spread without exceeding the elastic limit of the metal thereof with full spring back, as can be readily understood.

Each free end 14 of the legs 13 is formed to have an arcuate-shaped opening or slot 15 that in circumferential extent is somewhat more than half a circle. In this instance, said slots are aligned and have their intermediate portions disposed adjacent the edges 16 of the ends 14. Thus, the end walls 17 of said slots are located remotely from said edges 16.

The blade 6 is preferably formed of sheet metal of a hardness to properly cut through fruits and vegetables. Said blade has a more or less conventional cutter portion 18 that extends between the frame legs 13, an arcuate trunnion 19 at one end and extending into bearing engagement with the opening 15 in one leg 13, and the mentioned shredding extension 7 at the other end and extending into and through the opening 15 in the other frame leg 13.

In the usual manner, said cutter portion 18 is formed to have an edge 20 along one side of a slot 21 and a guide bar 22 along the opposite side of said slot. From FIG. 3 it will be seen how said edge 20 may shave or cut into an item of fruit or a vegetable, the paring or peeling so separated being guided by the lower part 22a of the cutter portion away from the body of the item being pared or sliced. No particular novelty is claimed for this portion 18 of the blade 6, the same having general comparability to the blade disclosed in my prior Patent No. 2,106,796.

The shredding extension 7, formed as an integral portion of the blade 6, and the arcuate trunnion 19, in combination with the above-described bearing openings 15, constitute the novel features of the present invention.

Figure 2:
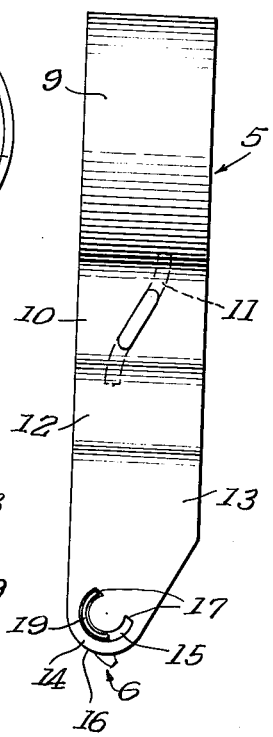
FIG. 2 is an end elevational view thereof.

Said trunnion 19, as can best be seen in FIG. 2, has a circumferential extent less than that of the opening 15 in which the same is loosely fitted. The portion 23 of the shredding extension 7 is similarly shaped and has the same circumferential extent as the trunnion 19. Thus, said portion 23 serves as a trunnion that has bearing support in the leg 13 that is opposite to the leg that has bearing support for the trunnion 19.

It will be clear that the opening end walls 17 form stops that limit oscillatory movement of the blade 6, the movement being limited by the difference in the circumferential extent of the openings 15 and the trunnions 19 and 23. Thus, an independent stop need not be provided for such oscillation limitation, as has been necessary in prior paring devices.

The shredding extension 7 simply comprises an arcuate extension 24 of the trunnion portion 23, and a rounded-over end 25 thereon. By providing sharp longitudinal edges 26 on said extension 24, the same is quite effective as a shredder of cabbage, lettuce, bar chocolate, soap to make chips, etc.

Because of the mentioned resiliency of the frame legs 13, it is a simple matter to mount or remove a blade 6 and, assurance may be had that, when mounted, such a blade has a non-binding, free oscillation that renders its operation highly efficient. Cleaning of the implement is easy and the same is self-cleaning, particularly with respect to the openings 15.

The extension 25 may be longer and stronger for best shredding results, and the same also has the purpose of lifting eyes out of potatoes, and for other gouging purposes.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but to desire to cover all modifications that may fall within the scope of the appended claims.

Having thus described my invention, what is claimed and desired to be secured by Letters Patent is:

1. A paring implement comprising a pair of spaced free-ended and flat frame legs provided with registering arcuate-shaped bearing openings in the flat sides thereof and in the free end of each leg, a blade member spanning between said frame legs, and an arcuate trunnion at each end of said blade member and loosely fitted into and having bearing in said openings.

2. A paring instrument according to claim 1 in which the circumferential extent of said trunnions is less than that of the bearing openings.

3. A paring instrument comprising a pair of spaced free-ended and flat frame legs provided with registering arcuate-shaped bearing openings in the flat sides thereof and in the free ends of each leg, a blade member spanning between said frame legs, an arcuate trunnion at each end of said blade member and loosely fitted into and having bearing in said arcuate openings, the circumferential extent of the arcuate-shaped openings being greater than half a circle and the extent of the openings being defined by end walls, the circumferential extent of the trunnions being less than that of the openings into which they are entered, said end walls of the openings, thereby, constituting oscillation-limiting stops for said trunnions and blade.

References Cited in the file of this patent

UNITED STATES PATENTS

| | | |
|---|---|---|
| 1,172,156 | Messina | Feb. 15, 1916 |
| 2,252,094 | Palmer | Aug. 12, 1941 |
| 2,266,278 | Senkewitz | Dec. 16, 1941 |
| 2,351,327 | Gamache | June 13, 1944 |
| 2,450,347 | Krilow | Sept. 28, 1948 |